United States Patent
Liu et al.

(10) Patent No.: US 8,240,137 B2
(45) Date of Patent: Aug. 14, 2012

(54) REDUCTANT INJECTION AND DECOMPOSITION SYSTEM

(75) Inventors: Z. Gerald Liu, Madison, WI (US); Jim Clerc, Columbus, IN (US); Jason Drost, Edgerton, WI (US); Jim Burke, Columbus, IN (US); Mihai Chiruta, Madison, WI (US); Achuth Munnannur, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 331 days.

(21) Appl. No.: 12/606,910

(22) Filed: Oct. 27, 2009

(65) Prior Publication Data

US 2011/0094206 A1    Apr. 28, 2011

(51) Int. Cl.
*F01N 3/36* (2006.01)
(52) U.S. Cl. ............... 60/295; 60/274; 60/286; 239/433
(58) Field of Classification Search .............. 60/286, 60/295, 274; 239/433
See application file for complete search history.

(56) References Cited

U.S. PATENT DOCUMENTS

| | | | |
|---|---|---|---|
| 5,522,218 A | 6/1996 | Lane et al. | |
| 6,539,708 B1 * | 4/2003 | Hofmann et al. | 60/286 |
| 6,722,123 B2 | 4/2004 | Liu et al. | |
| 6,722,124 B2 | 4/2004 | Pawson et al. | |
| 6,789,754 B2 * | 9/2004 | Peterson, Jr. | 239/533.2 |
| 7,059,118 B2 | 6/2006 | Ripper et al. | |
| 7,152,396 B2 * | 12/2006 | Cheng | 60/286 |
| 7,481,042 B2 | 1/2009 | Mahr | |
| 2003/0079467 A1 * | 5/2003 | Liu et al. | 60/286 |
| 2006/0191254 A1 * | 8/2006 | Bui et al. | 60/286 |
| 2007/0101703 A1 * | 5/2007 | Kanaya et al. | 60/286 |
| 2008/0216470 A1 * | 9/2008 | Sedlacek et al. | 60/324 |
| 2008/0236147 A1 | 10/2008 | Van Vuuren et al. | |
| 2009/0019843 A1 * | 1/2009 | Levin et al. | 60/303 |
| 2009/0107126 A1 | 4/2009 | Bugos et al. | |

FOREIGN PATENT DOCUMENTS

KR    1020090105593 A    10/2009

OTHER PUBLICATIONS

PCT/US2010/054339, International Search Report and Written Opinion, Jul. 1, 2011.

* cited by examiner

*Primary Examiner* — Kenneth Bomberg
*Assistant Examiner* — Jorge Leon, Jr.
(74) *Attorney, Agent, or Firm* — Kunzler Law Group PC

(57) ABSTRACT

According to one embodiment, a reductant injection apparatus includes an injector attachment portion to which a reductant injector is coupleable. The apparatus also includes a perforated tubular portion coupled to the injector attachment portion. The perforated tubular portion includes an inlet, an outlet, and a diverging sidewall extending from the inlet to the outlet. Additionally, a plurality of perforations is formed in the sidewall. A reductant spray can be injected into the perforated tubular portion via the inlet. Further, a portion of a bulk exhaust gas stream can be diverted into the perforated tubular portion through the plurality of perforations, through the perforated tubular element, and out of the perforated tubular portion through the plurality of perforations. The portion of exhaust gas stream can then be rejoined with the bulk exhaust gas stream downstream of the perforated tubular portion.

21 Claims, 8 Drawing Sheets

REDUCTANT INJECTION AND DECOMPOSITION SYSTEM

FIELD

This invention relates to exhaust systems for internal combustion engines, and more particularly to a reductant injection system for a selective catalytic reduction (SCR) catalyst of an exhaust aftertreatment system.

BACKGROUND

Exhaust aftertreatment systems receive and treat exhaust gas generated by an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

The SCR catalyst is configured to reduce $NO_x$ into less harmful emissions, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of gaseous ammonia. Accordingly, conventional systems are designed to inject a diesel exhaust fluid or reductant into the exhaust gas, which is capable of decomposing into gaseous ammonia in the presence of exhaust gas under certain conditions. The reductant commonly used by conventional exhaust aftertreatment systems is a urea-water solution (hereinafter "urea").

Generally, the decomposition of urea into gaseous ammonia occupies three stages. First, urea evaporates or mixes with exhaust gas. Second, the temperature of the exhaust causes a thermolysis-induced phase change in the urea and decomposition of the urea into isocyanic acid (HNCO) and $NH_3$. Third, the isocyanic acid reacts with water in a hydrolysis process under specific pressure and temperature concentrations to decompose into ammonia and carbon dioxide ($CO_2$). The gaseous ammonia is then introduced at the inlet face of the SCR catalyst, flows through the catalyst, and is consumed in the $NO_x$ reduction process. Any unconsumed ammonia exiting the SCR system can be reduced to $N_2$ and other less harmful or less noxious components using an ammonia oxidation catalyst.

SCR systems typically include a urea source and a urea injector or doser coupled to the source and positioned upstream of the SCR catalyst. The urea injector injects urea into a decomposition space through which an exhaust gas stream flows. Upon injection into the exhaust gas stream, the injected urea spray is heated by the exhaust gas stream to trigger the decomposition of urea into ammonia. As the urea and exhaust gas mixture flows through the decomposition space, the urea further mixes with the exhaust gas before entering an the SCR catalyst. Ideally, urea is sufficiently decomposed and mixed with the exhaust gas prior to entering the SCR catalyst to provide an adequately uniform distribution of ammonia at the inlet face of the SCR catalyst.

Some prior art exhaust aftertreatment systems, however, do not provide adequate decomposition and mixing of injected urea. Often, conventional systems cause exhaust gas recirculation or low temperature regions within the decomposition space. Exhaust gas recirculation and low temperature regions may result in inadequate mixing or decomposition, which may lead to the formation of solid urea deposits on the inner walls of the decomposition space and urea injector. Additionally, inadequate mixing may result in a low ammonia vapor uniformity index, which can lead to uneven distribution of the ammonia across the SCR catalyst surface, lower $NO_x$ conversion efficiency, and other shortcomings.

The formation of solid urea deposits and uneven ammonia distribution may also be caused by urea spray being deflected away from an intended target. Following injection, the urea spray typically rapidly decelerates due to entrainment of exhaust gas into the spray. Rapid deceleration reduces urea spray penetration and momentum, which makes the injected urea spray susceptible to substantial redirection when contacted by exhaust flow gases. Undesirable redirection of urea spray may result in urea spray unintentionally contacting certain surfaces of the decomposition space (e.g., an inner wall of a decomposition tube and an upper portion of a mixer) and forming solid urea deposits thereon. The formation of solid urea deposits within the decomposition space typically results in a lower amount of ammonia concentration and a lower ammonia distribution uniformity index at the inlet face of the SCR catalyst, which can degrade the performance and control of the SCR catalyst.

SUMMARY

The subject matter of the present application has been developed in response to the present state of the art, and in particular, in response to the problems and needs in the art that have not yet been fully solved by currently available exhaust aftertreatment systems employing an SCR system. Accordingly, the subject matter of the present application has been developed to provide a reductant injection and decomposition system, and associated apparatus and methods, that overcomes at least some of the above or other shortcomings of prior art reductant injection techniques. For example, in some embodiments, a reductant injection and decomposition system of the present invention enhances urea spray penetration, urea spray targeting, and urea decomposition to achieve a desirably uniform distribution of ammonia across the inlet face of the SCR catalyst and reduce solid reductant deposits on the walls of exhaust aftertreatment system. In certain implementations, this is accomplished by reducing exhaust recirculation and low temperature regions within a urea decomposition space and reducing entrainment of exhaust gas into the urea spray.

According to one embodiment, a reductant injection apparatus includes an injector attachment portion to which a reductant injector is coupleable. The apparatus also includes a perforated tubular portion coupled to the injector attachment portion. The perforated tubular portion includes an inlet, an outlet, and a diverging sidewall extending from the inlet to the outlet. Additionally, a plurality of perforations is formed in the sidewall.

According to some implementations, the sidewall defines a reductant spray channel through which a reductant spray is flowable in a first direction extending from the inlet to the outlet. The injector attachment portion can secure a reductant injector in a predetermined orientation relative to the perforated tubular portion.

In some implementations, the plurality of perforations is arranged in a plurality of rows. In certain implementations, the plurality of rows includes a first row of perforations each having a first size and a second row of perforations each having a second size smaller than the first size. The first row of perforations is closer to the inlet than the second row of perforations.

In yet certain implementations, the plurality of rows includes a first row of a first number of perforations and a second row of a second number of perforations. The second number is smaller than the first number, and the first row is closer to the inlet than the second row.

In further implementations, the plurality of rows includes at least first, second, and third rows of perforations. The first row of perforations is separated from the second row of perforations by a first distance, and the second row of perforations is separated from the third row of perforations by a second distance more than the first distance. The first row of perforations is closer to the inlet than the second row of perforations.

According to some implementations, a percent open area of the perforated tubular portion is between about 11% and about 33%. The local percent open area proximate the inlet of the perforated tubular portion can be larger than a local percent open area proximate the outlet of the perforated tubular portion.

In certain implementations, the perforated tubular portion has a cross-sectional shape corresponding to a cross-sectional shape of a reductant spray pattern associated with the reductant injector. The perforated tubular portion can be substantially conical-shaped. Further, the diverging sidewall can form a first included angle and a reductant spray pattern associated with the reductant injector can form a second included angle where the first included angle is between about 5-degrees and about 15-degrees larger than the second included angle.

According to another embodiment, a reductant injection and decomposition system for a selective catalytic reduction system includes a housing through which exhaust gas is flowable and a perforated tubular element. The housing includes a reductant injector receptacle. The perforated tubular element is coupleable to the reductant injector receptacle in exhaust gas receiving communication with the exhaust gas stream and reductant spray receiving communication with a reductant injector coupled to the reductant injector receptacle. Moreover, the perforated tubular element includes an inlet, an outlet, and a diverging sidewall extending from the inlet to the outlet where a plurality of perforations is formed in the side wall. Reductant spray from the reductant injector flows within the perforated tubular element from the inlet to the outlet and a portion of the exhaust gas stream enters the perforated tubular element via the plurality of perforations and exits the perforated tubular element via the plurality of perforations.

In some implementations of the system, the perforated tubular element secures the reductant injector in a predetermined orientation such that the reductant injector sprays reductant in a direction parallel to a central axis of the perforated tubular element. The reductant receptacle secures the perforated tubular element such that the central axis of the perforated tubular element is at a predetermined injected spray angle relative to an exhaust gas stream flow direction. The predetermined injected spray angle can lead to a spray drift angle between about zero degrees and about seven degrees. The spray drift angle is the difference between the predetermined injected spray angle and a combined spray and exhaust gas angle defined between a velocity vector of a combined reductant spray and exhaust gas mixture and the exhaust gas stream flow direction.

According to certain implementations, the housing defines a substantially cylindrically-shaped decomposition chamber and the reductant injector receptacle defines a space positioned about a periphery of the decomposition chamber. The perforated tubular element is positioned within the space of the reductant injector receptacle and the outlet of the perforated tubular element is positioned within the decomposition chamber. The perforated tubular element can be positioned within the space such that a gap is defined between a downstream portion of the perforated tubular element and a wall of the reductant injector receptacle. The portion of the exhaust gas stream flows through the gap upon exiting from the perforated tubular element.

According to yet another embodiment, a method for injecting reductant into an exhaust gas stream includes positioning a perforated tubular element in the exhaust gas stream and in reductant receiving communication with a reductant injector. The perforated tubular element includes an inlet, an outlet, and a diverging sidewall extending from the inlet to the outlet. A plurality of perforations is formed in the side wall. The method further includes injecting a reductant spray into the perforated tubular element via the inlet, pushing a portion of the exhaust gas stream into the tubular element through the plurality of perforations, and pulling the portion of the exhaust gas stream within the tubular element out of the tubular element through the plurality of perforations.

In some implementations, the method further includes transferring at least one of mass, momentum, and energy from the portion of exhaust gas stream within the perforated tubular element to the reductant spray within the perforated tubular element. The method can also include positioning a leading edge of the perforated tubular element in the exhaust gas stream to divert a portion of the exhaust gas stream about the outlet of the perforated tubular element.

According to certain implementations, pushing the portion of the exhaust gas into the tubular element includes stagnating exhaust gas against an upstream portion of the perforated tubular element, which can convert dynamic head into static head. Moreover, pulling the portion of the exhaust gas within the tubular element out of the tubular element can include accelerating exhaust gas proximate a downstream portion of the perforated tubular element via a venturi effect.

In another embodiment, a method for injecting reductant into an exhaust gas stream includes positioning a perforated tubular element in a bulk exhaust gas stream and in reductant receiving communication with a reductant injector. The perforated tubular element includes an inlet, an outlet, and a diverging sidewall extending from the inlet to the outlet. A plurality of perforations is formed in the side wall. The method includes injecting a reductant spray into the perforated tubular element via the inlet and diverting a portion of the bulk exhaust gas stream into the perforated tubular element through the plurality of perforations, through the perforated tubular element, and out of the perforated tubular element through the plurality of perforations. Additionally, the method includes rejoining the portion of the exhaust gas stream with the bulk exhaust gas stream downstream of the perforated tubular element.

Reference throughout this specification to features, advantages, or similar language does not imply that all of the features and advantages that may be realized with the present invention should be or are in any single embodiment or implementation of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment or implementation.

The described features, advantages, and characteristics of the invention may be combined in any suitable manner in one or more embodiments and/or implementations. One skilled in the relevant art will recognize that the invention may be practiced without one or more of the specific features or advantages of a particular embodiment or implementation. In other instances, additional features and advantages may be recognized in certain embodiments and/or implementations that may not be present in all embodiments or implementations of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an expressed correlation to indicate otherwise, an implementation may be associated with one or more embodiments.

The described features, structures, or characteristics of the invention may be combined in any suitable manner in one or more embodiments. In the following description, numerous specific details are provided to impart a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Described herein are various embodiments of a reductant injection and decomposition system and associated apparatus and methods for, among other things, enhancing the decomposition of a reductant, such as urea, to ammonia in an exhaust gas, and improving the mixing of urea with exhaust gas. The reductant injection and decomposition system forms part of an exhaust aftertreatment system that has an SCR system. Generally, in one embodiment, the reductant injection and decomposition system includes a perforated tube-like element in reductant receiving communication with a reductant injector and reductant providing communication with exhaust gas in a fixed volume chamber. The perforations in the tube-like element facilitate lateral flow of exhaust through the element while reductant flows substantially in an axial direction through the element. In certain implementations, the tube-like element improves reductant decomposition and mixing by reducing recirculation of exhaust gas, reducing low temperature pockets, facilitating the transfer of heat from the exhaust gas to injected reductant within the tube-like element, reducing entrainment of exhaust gas into the injected reductant, increasing reductant spray penetration, improving reductant spray targeting, and reducing the formation of reductant deposits.

Figure 1:
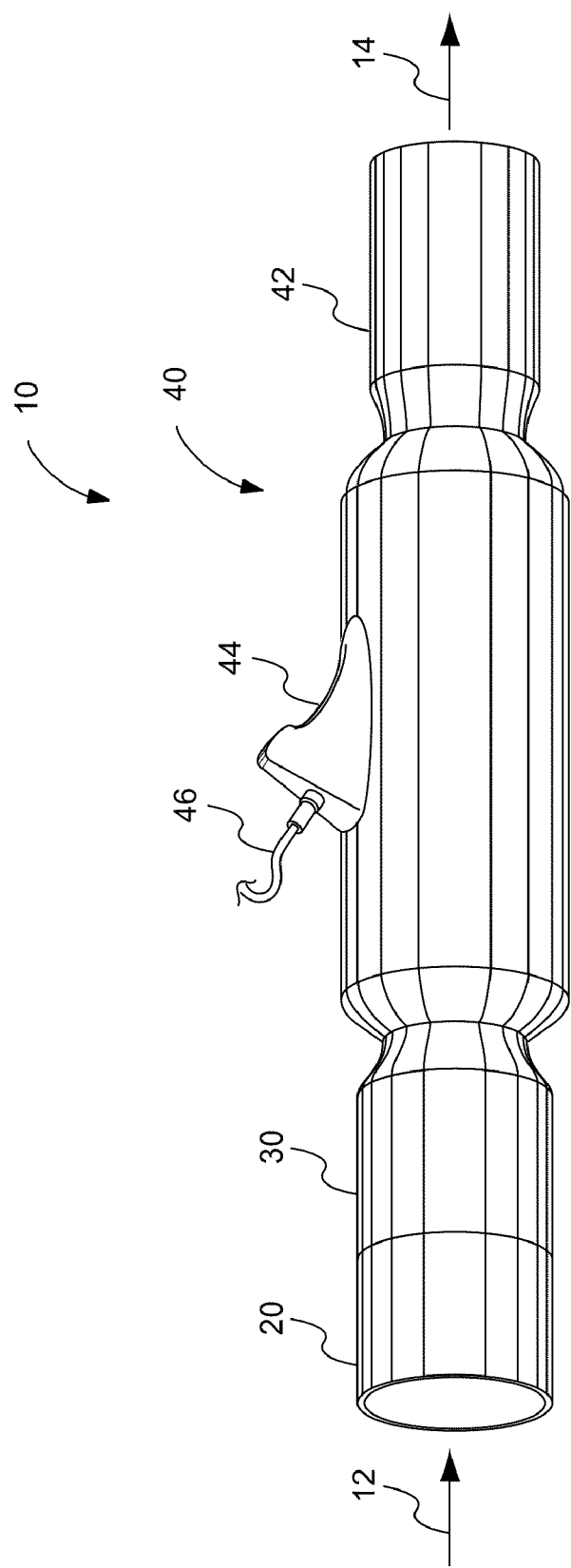
FIG. 1 is a perspective view of an exhaust aftertreatment system having a reductant injection and decomposition system according to an embodiment.

In one specific embodiment illustrated in FIG. 1, an exhaust aftertreatment system 10 is coupled to an internal combustion engine (not shown). The aftertreatment system 10 is capable of receiving and treating exhaust gas generated by the engine as indicated by directional arrow 12. After being treated by the aftertreatment system 10, exhaust gas is expelled into the atmosphere via a tailpipe (not shown) as indicated by directional arrow 14. In certain implementations, the exhaust aftertreatment system 10 is secured to a vehicle in which the engine is housed.

The exhaust aftertreatment system 10 includes a plurality of exhaust treatment devices. For example, the exhaust aftertreatment system 10 includes a diesel oxidation catalyst (DOC) 20 and a diesel particulate filter (DPF) 30 downstream of the DOC. The aftertreatment system 10 also includes a selective catalytic reduction (SCR) system 40 having an SCR catalyst 42. The SCR system 40 also includes a reductant injection and decomposition system 44 that has a reductant injector 46 coupled to a reductant supply source (not shown). The reductant injector 46 injects reductant from the supply source into a reductant decomposition chamber 102 (see FIG. 2) upstream of the SCR catalyst 42. In certain implementations, the reductant is urea as defined above. In the reductant decomposition chamber, the reductant mixes with exhaust gas flowing through the decomposition chamber and decomposes to gaseous ammonia prior to being introduced with the exhaust gas into the SCR catalyst 42. The gaseous ammonia reacts with $NO_x$ in the presence of the SCR catalyst 42 to reduce the $NO_x$ to less harmful emissions. Although the exhaust aftertreatment system 10 of FIG. 1 shows one DOC 20, DPF 30, and SCR catalyst 42 in a specific order relative to each other, in other embodiments, an exhaust aftertreatment system can have fewer or more than the number of exhaust treatment devices shown in FIG. 1 in a different order relative to each other without departing from the essence of the invention.

Figure 2:
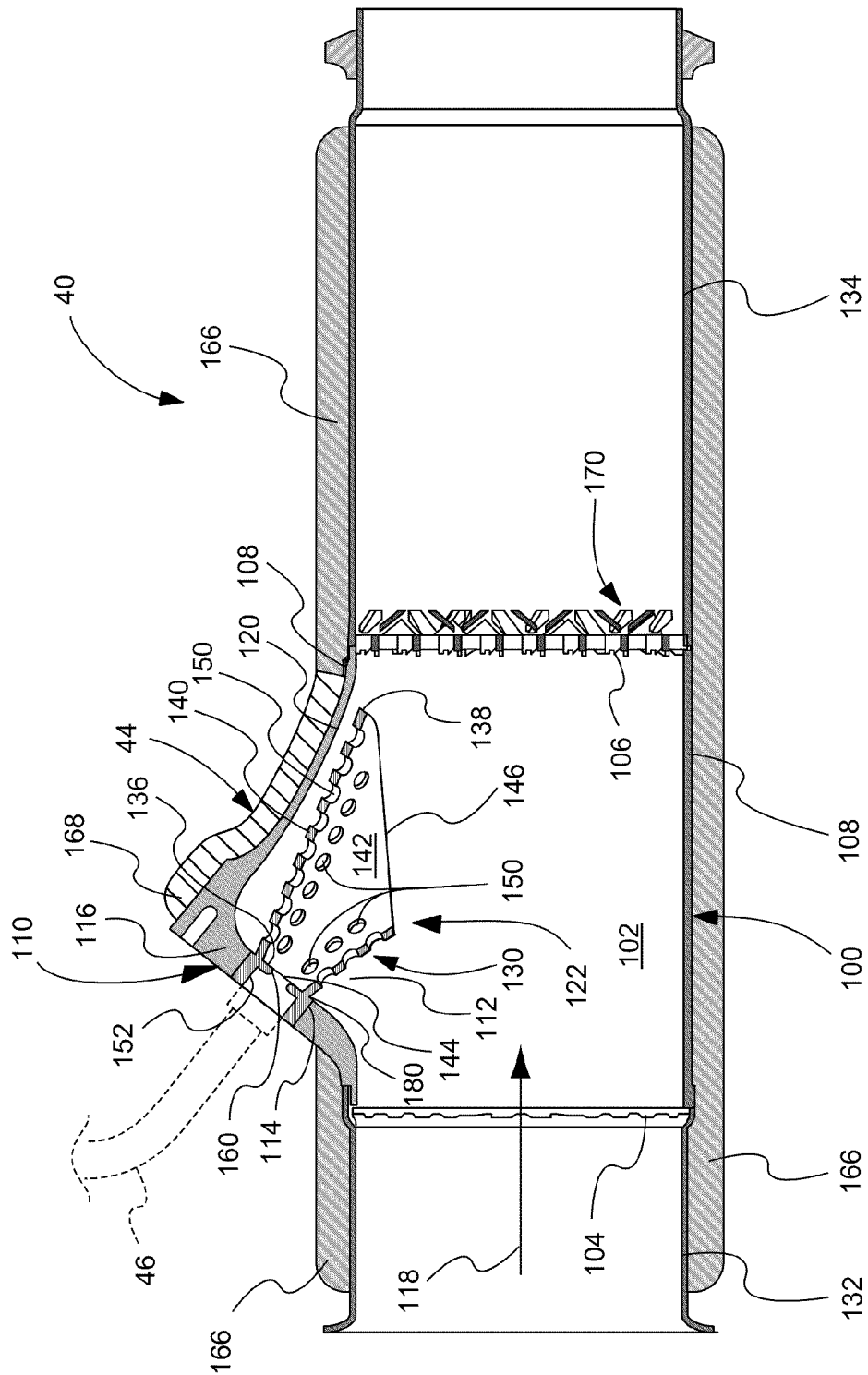
FIG. 2 is a cross-sectional side view of the exhaust aftertreatment system of FIG. 1.

Referring to FIG. 2, the reductant injection and decomposition system 44 includes a housing or casing 100. The housing 100 defines the decomposition chamber 102 or portion of the decomposition chamber 102 and has an inlet 104 and outlet 106. In certain implementations, the decomposition chamber is substantially cylindrically-shaped. The housing 100 is coupleable to other housings, such as housings 132, 134, forming part of the exhaust aftertreatment system 10. The housings 132, 134 are configured to couple the housing 100 to other exhaust aftertreatment components. Additionally, housing 134 provides an additional length of tubing for further decomposition of urea to ammonia prior to entering an SCR catalyst, which could be positioned downstream of housing 134. To minimize heat loss, the housings 100, 132, 134 can be at least partially encapsulated by a layer of insulation 166, 168.

In certain implementations, the exhaust aftertreatment system 10 includes a mixer 170 positioned proximate the outlet 106 of the housing 100. In other implementations, the mixer 170 can be positioned downstream of the outlet 106 of the housing 100. The mixer 170 is configured to facilitate mixing of injected reductant and exhaust gas flowing through the housing 100. In some implementations, the reductant injection and decomposition system 44 sufficiently mixes the urea spray with exhaust gas such that a dedicated mixer 170 is not necessary.

The housing 100 includes a reductant injector receptacle 110 extending outwardly from an external surface 108 of the housing. The reductant injector receptacle 110 defines an injector portion 112 of the decomposition chamber 102. The injector portion 112 can be the portion of the decomposition chamber 102 outward of an outer periphery of the housing 100. The reductant injector receptacle 110 includes an aperture 114 formed in a first wall 116 of the receptacle that extends away from the housing 100 in an exhaust flow direction indicated by directional arrow 118. The reductant injector receptacle 110 also includes a second wall 120 that extends toward the housing 100 in the exhaust flow direction 118.

The reductant and decomposition system 44 includes a passive exhaust pump system 122 made operable by a reductant injection tube 130 positioned within at least the injector portion 112 of the decomposition chamber 102 (see FIG. 2). In some implementations, the reductant injection tube 130 extends into the decomposition chamber 102 beyond the injector portion 112 as shown in FIG. 2. As defined herein, the reductant injection tube 130 can have any of various shapes resembling a hollow tube or cone, i.e., having an inlet with a first area, an outlet with a second area larger than the first cross-sectional area, and a substantially diverging sidewall extending from the inlet to the outlet. The reductant injection tube 130 illustrated in FIG. 2 has a substantially circular cross-sectional area and has a substantially conical shape. As can be seen in the drawing, the reductant injection tube 130 has a substantially conical shape that is inclined with respect to the flow 118 of the exhaust gas, and with the outlet 146 having a truncated end that extends beyond the injector portion 112 into the exhaust flow passing through the decomposition chamber 102. The truncated end of the outlet 146 is also oriented at a slight angle with respect to the direction of flow 118 of the exhaust gas. However, in embodiments, the reductant injection tube 130 can have any of various cross-sectional shapes, such as ovular, triangular, and rectangular. Generally, the cross-sectional shape of the reductant injection tube 130 corresponds with the cross-sectional shape of a spray pattern of the reductant injector 46.

Figure 3:
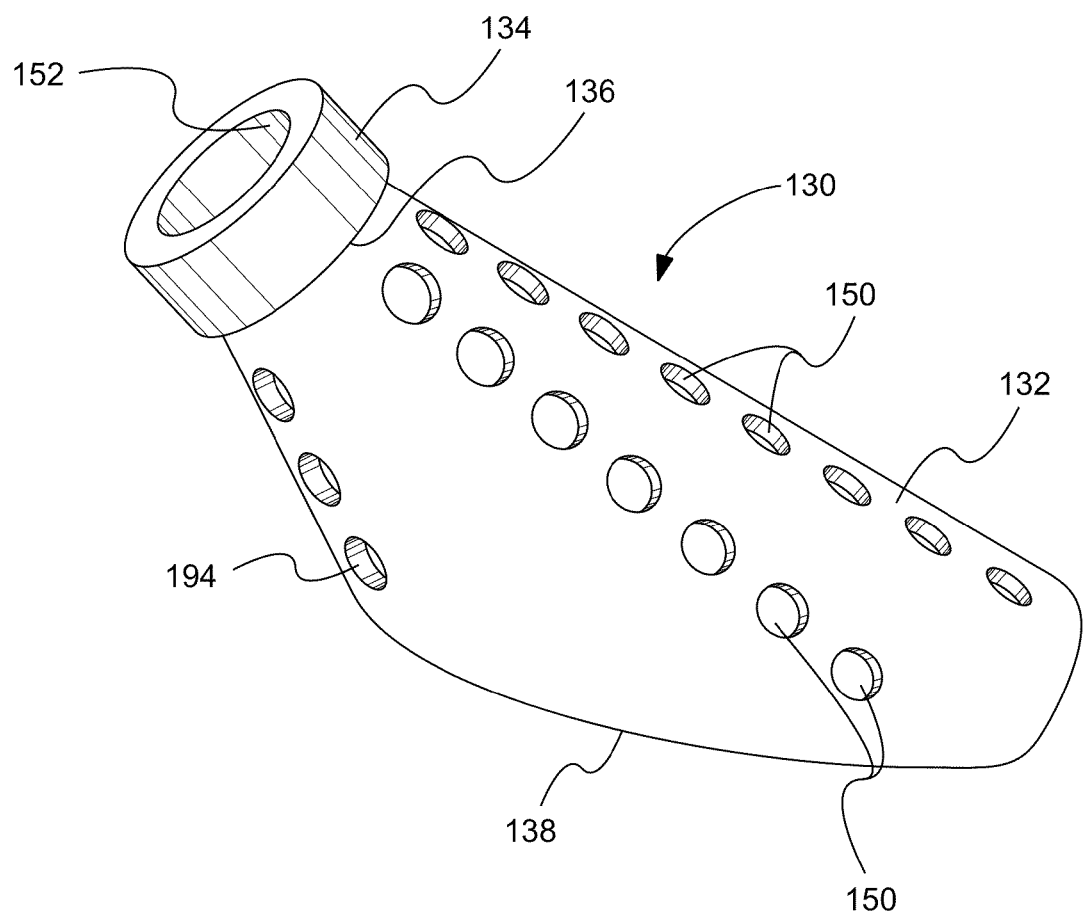
FIG. 3 is a perspective view of a perforated injection tube according to one embodiment.
Figure 4:
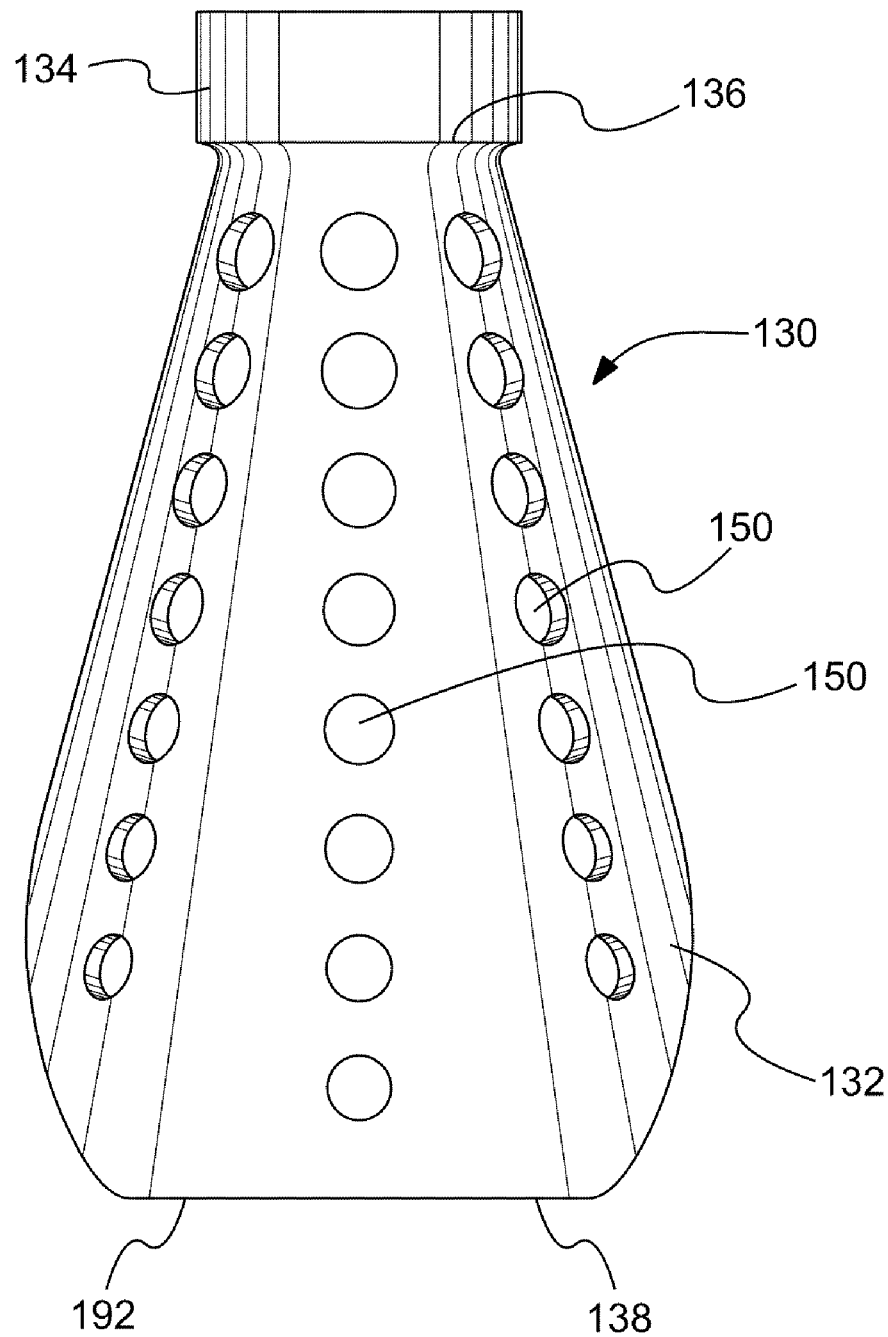
FIG. 4 is a top view of the perforated injection tube of FIG. 3.

Referring to FIGS. 3 and 4, the reductant injection tube 130 includes a perforated tubular portion 132 extending from an attachment portion 134. The perforated tubular portion 132 extends from a first end 136 proximate the attachment portion 134 to a second end 138. The wall 140 of the perforated tubular portion 132 diverges in a direction extending from the first end 136 to the second end 138 (see FIG. 2). The inner surface of the wall 140 of the perforated tubular portion 132 defines a reductant spray channel 142 extending from an inlet 144 at the first end 136 to an outlet 146 at the second end 138. The cross-sectional area of the reductant spray channel 142 increases in a direction extending from the inlet 144 to the outlet 146. The perforated tubular portion 132 includes a plurality of apertures or perforations 150 (e.g., through holes) formed in the wall 140. Each of the perforations 150 can have any of various shapes and sizes and be positioned along the perforated tubular portion 132 at any of various locations. In certain implementations, the plurality of perforations 150 are arranged in one or more predetermined patterns based on desired performance characteristics of the reductant injection and decomposition system 44 and other parameters as will be explained in more detail below.

The attachment portion 134 of the reductant injection tube 130 secures the perforated tubular portion 132 to the reductant injector receptacle 110 at a predetermined orientation relative to the receptacle and the exhaust flow direction 118. The attachment portion 134 matingly engages the aperture 114 of the reductant injector receptacle 110. In certain implementations, the aperture 114 includes internal threads and the attachment portion 134 includes external threads that are threadably engageable with the internal threads of the aperture 114. The attachment portion 134 also includes a reductant injector port 152 that matingly engages the injector 46 and positions the injector in a predetermined orientation relative the reductant injector receptacle 110 and thus the exhaust flow direction 118. In some implementations, the reductant injector port 152 includes internal threads that are threadably engageable with external threads on the injector 46. Referring to FIG. 2, the reductant injection tube 130 includes an aperture 160 coupling the reductant spray channel 142 and the reductant injector port 152. In certain implementations, a nozzle of the injector 46 is positioned within the aperture 160 and sprays reductant directly into the reductant spray channel 142. In other implementations, the nozzle of the injector 46 sprays reductant through the aperture 160 into the reductant spray channel 142.

The reductant injector receptacle 110 is configured to secure and retain the reductant injection tube 130 and reductant injector 46 in predetermined orientations relative to each other. More specifically, the receptacle 110 secures the tube 130 and the tube secures the injector 46. Preferably, in certain embodiments, the reductant injector receptacle 110 retains a central axis of the reductant injection tube 130 and the reductant injector 46 perpendicular relative to the first wall 116. In this manner, the reductant injector receptacle 110 ensures the reductant injector 46 sprays reductant into the reductant spray channel 142 of the reductant injection tube 130 in a desired direction relative to the tube 130 and the exhaust flow direction 118.

Figure 5:
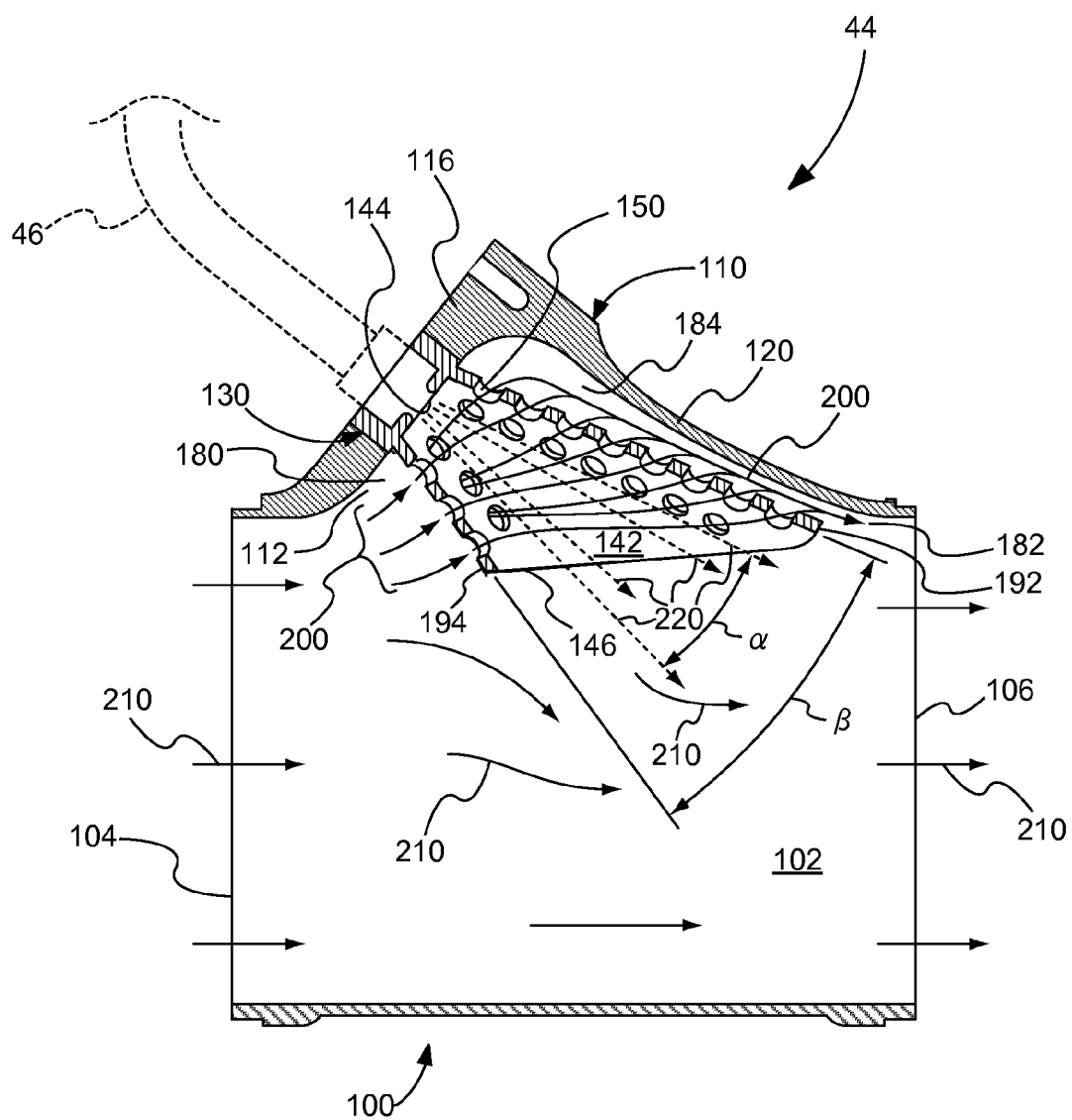
FIG. 5 is a cross-sectional side view of the exhaust aftertreatment system of FIG. 1 showing exhaust and reductant flow patterns according to one embodiment.

Referring to FIG. 5, the injector portion 112 of the decomposition chamber 102 and the reductant injection tube 130 are sized and shaped to define a first space 180 and second space 182. The first space 180 is defined upstream of the reductant injection tube 130 between an upstream portion of the tube, the first wall 116 of the receptacle 110, and an inner surface of the housing 100. The second space 182 is defined downstream of the reductant injection tube 130 between a downstream portion of the tube, the second wall 120 of the receptacle 110, and an inner surface of the housing 100 As can be seen in FIG. 5, the reductant injection tube 130 has a substantially conical shape that is inclined with respect to the bulk flow 210 of the exhaust gas. The truncated outlet 146 end of the reductant injection tube 130 is located within the decomposition chamber 102 beyond the injector portion 112, and is oriented closer to parallel with the direction of flow of the exhaust gas than if the substantially conical shape was not truncated. Consequently, the reductant injection tube 130 has an upstream portion or leading edge 194 which is shorter in length from the inlet 144 to the outlet 146, and includes fewer perforations, than the downstream portion or trailing edge 192.

The first space 180 defines an exhaust stagnation space in which exhaust exhibits a high static pressure due to its interaction with the upstream portion of the reductant injection tube 130. In other words, the upstream portion or leading edge 194 of the reductant injection tube 130 obstructs exhaust flow to create a space in which exhaust gas is substantially stagnant. The high static pressure of exhaust gas within the first space 180 forces or pushes exhaust gas in the first space into the perforations 150 in the reductant injection tube 130.

The second space 182 defines an exhaust acceleration space in which exhaust exhibits a low static pressure due to a venturi effect proximate a downstream portion or trailing edge 192 of the reductant injection tube 130. The venturi effect accelerates the exhaust gas at the trailing edge 192 of the reductant injection tube 130, which creates a space in which exhaust gas has a low static pressure. The low static pressure of exhaust gas within the second space 182 draws or pulls exhaust gas in the reductant injection tube 130 out of the reductant injection tube 130 via the perforations 150. The exhaust gas exiting the reductant injection tube 130 flows into a gap 184 defined between the tube and the second wall 120 of the receptacle 110. The gap 184 extends from proximate the inlet 144 of the reductant spray channel 142 to the outlet 146 of the channel.

Based on the foregoing, the injection and decomposition system 44 is configured to act as a passive exhaust pump 122 by effectively pushing exhaust gas into the reductant injection tube 130 and pulling exhaust gas out of the injection tube. In this manner, exhaust gas within the reductant injection tube 130 is continuously replenished with "fresh" exhaust gas to reduce, and in some instances eliminate, recirculation within the injection tube and decomposition chamber 102. Reducing recirculation helps to reduce the high residence times that may result in localized spots of high isocyanic acid concentration, reductant deposit formation, and poor system performance. For example, the passive exhaust pump 122 acts to reduce solid reductant deposits by increasing the temperature of the reductant and reducing the partial vapor pressure of constituents in the reductant and exhaust gas that tend to form the deposits.

Generally, a portion of exhaust gas flowing through the housing 100 flows into the first space 180, enters the reductant spray channel 142 of the reductant injection tube 130 via perforations 150, flows substantially laterally across the reductant spray channel of the tube, exits the reductant spray channel via perforations 150, flows into and through the second space 182 and gap 184, and rejoins the exhaust gas flowing through the housing 100.

In this manner, the reductant injection tube 130 acts to divert a portion 200 of the exhaust gas stream entering the housing 100 through the tube, while the bulk 210 of the exhaust gas stream flows around the tube. The continuous stream of "fresh" exhaust gas through the reductant injection tube 130 effectuated by the passive exhaust pump 122 restricts the formation of solid reductant deposits on the internal surface of the tube by reducing recirculation and low temperature regions within the exhaust gas. Moreover, the separated exhaust gas stream 200 traversing the reductant spray channel 142 contacts the reductant spray 220 and transfers heat to the spray 220. The transferred heat provides energy for urea decomposition, e.g., water evaporation and urea thermolysis.

Referring again to FIG. 5, the reductant injector 46 injects reductant spray 220 into the bulk exhaust gas stream 210 via the reductant injection tube 130. The reductant spray 220 flows through the reductant spray channel 142 in an inlet-to-outlet direction and exits the channel into the decomposition chamber 102 via the outlet 146. As reductant spray enters an exhaust gas stream, the reductant generally loses momentum, reductant spray targeting is reduced, and spray drift is increased. However, because the reductant spray 220 is at least partially confined from the bulk exhaust stream 210 by the reductant injection tube 130 after being injected by the reductant injector 46, the spray penetration, momentum, and targeting is better conserved than if the reductant spray were sprayed directly into the bulk exhaust gas stream 210. Accordingly, spray droplets are much less susceptible to being deflected by the bulk exhaust gas 210 onto the surfaces of the housing 100 and forming solid reductant deposits thereon. Although the separated exhaust gas stream 200 passing through the reductant injection tube 130 may negatively impact the momentum, targeting, and cohesiveness of the reductant spray 220, the impact from the separated stream is much less severe than the bulk stream.

In certain implementations, the leading edge 194 of the injection tube 130 deflects exhaust gas away from the outlet 146 of the reductant spray channel 142 to preserve the penetration, momentum, and direction of the spray 220. In some implementations, injection tube 130 is aerodynamically designed to have a slightly concave leading edge 194 (e.g., a concave surface facing upstream) and an elongated concave trailing edge 192 (e.g., a concave surface facing downstream). The concave leading edge may act to facilitate the separation of a portion of exhaust gas upwards toward the reductant injector 46 and diversion of the bulk exhaust away from the outlet of the channel.

Solid deposit formation is reduced and heat transfer from the exhaust gas 200 to the spray 220 within the reductant injection tube 130 is improved by use of the gap 184 between the tube and second wall 120 of the reductant injector receptacle 110. The gap 184 acts as a barrier to restrict reductant spray 220 in the reductant spray channel 142 from exiting the reductant injection tube 130 through the perforations 150. Because the gap 184 keeps reductant spray 220 within the reductant injection tube 130, the reductant spray 220 does not contact the surface of the second wall 120, and thus does not form solid deposits on the wall.

Further, the gap 184 acts to reduce the temperature gradient between the reductant injection tube 130 and the second wall 120. Because the temperature gradient is decreased, heat transfer from exhaust gas 200 within the reductant injection tube 130 to the second wall 120 is also decreased, which effectively traps the heat from the exhaust gas within the tube. By trapping the heat within the reductant injection tube 130, heat transfer from exhaust gas 200 to the reductant spray 220 is improved.

Additionally, the gap 184 reduces the surface attraction force of the second wall 120. Accordingly, the surface of the second wall 120 attracts fewer reductant spray droplets, which lowers the likelihood of solid reductant deposits forming on the surface. Additionally, in certain implementations, the perforations 150 along the downstream surface of the injection tube 130 can be plugged to prevent reductant spray from exiting through the perforations 150 and contacting the second wall 120. Alternatively, the injection tube 130 can be formed without perforations along the downstream surface of the tube.

The reductant injector receptacle 110 and reductant injection tube 130 should be designed to achieve desirable fluid dynamic conditions conducive to achieving improved reductant decomposition and reduced reductant solid deposit formation. According to some embodiments, the design parameters include, among others, the injected spray angle, combined spray and exhaust gas angle, percent open area of reductant injection tube 130, the configuration of the perforations 150 of the tube, and the included angles of the reductant spray 220 and injection tube.

The momentum, penetration, drift, and targeting of reductant spray is at least partially dependent upon the injected spray angle and associated combined spray and exhaust gas angle. When a reductant is sprayed into a gas, such as exhaust gas, the momentum of the reductant spray is transferred to the gas. Additionally, the reductant spray entrains, e.g., draws in, a portion of the gas into the spray. Following a free jets model, the mass flow rate $\dot{m}_{entr}$ of gas being entrained into the spray can be expressed as:

$$\dot{m}_{entr} = K_{entr}\sqrt{\rho_G M_0} x \qquad (1)$$

where $K_{entr}$ is an entrainment constant, $M_0$ is the momentum rate of the reductant spray, $\rho_G$ is the density of the entrained gas, and x is an axial distance from the point of injection to a point of interest. Again, following a free jets model, the axial velocity $V_{entr}$ of the entrained gas at any location x away from the point of injection can be expressed as:

$$V_{entr} = \min\left(u_{inj}, \frac{3u_{inj}d_{noz}\sqrt{\frac{\rho_L}{\rho_G}}}{K_{entr}x}\left(\frac{1}{\left(1+\frac{12r^2}{K_{entr}^2 x^2}\right)^2}\right)\right) \qquad (2)$$

where $u_{inj}$ is the injection velocity of the reductant spray, $d_{noz}$ is the diameter of the reductant nozzle, $\rho_L$ is the density of the reductant, and r is the radial distance from a core, e.g., central axis, of the spray to the location of interest.

At locations well downstream of the point of reductant injection, the velocity of the reductant spray will be approximately equal to the velocity of the gas. Based on this generalization, the velocity $V_{entr}$ of the entrained gas at the core of the reductant spray can provide a conservative estimate of the velocity $V_{spray}$ of the reductant spray at any axial location away from the point of injection as follows:

$$V_{spray} = \min\left(u_{inj}, \frac{3u_{inj}d_{noz}\sqrt{\frac{\rho_L}{\rho_G}}}{K_{entr}x}\right) \qquad (3)$$

The resultant velocity $V_{res}$ of a reductant spray and exhaust gas mixture after the spray reaches the exhaust gas flowing at velocity $V_{exh}$ can be expressed as:

$$V_{res} = \sqrt{V_{exh}^2 + V_{spray}^2 + 2V_{exh}V_{spray}\cos\theta} \qquad (4)$$

where $V_{spray}$ can be determined from Equation 3 and $\cos\theta$ can be determined from the following expression:

$$\phi = \arcsin\left(\frac{V_{spray}}{V_{res}}\sin\theta\right) \qquad (5)$$

where θ is the injected spray angle defined between a direction of the core, e.g., central axis, of the reductant spray and the exhaust gas flow direction and φ is the combined spray and exhaust gas angle defined between a direction of the reductant spray and exhaust gas mixture and the exhaust gas flow direction. The lower a spray drift angle (i.e., the difference between the injected spray angle θ and the combined spray and exhaust gas angle φ (e.g. θ−φ), the higher the momentum and penetration, the lower the probability for reductant spray drift, and the higher the probability of the reductant spray following an intended target path. Accordingly, the direction of the reductant spray, reductant spray flow rate, design of the reductant injection tube, and exhaust flow rate can be adjusted to achieve a desired reductant spray momentum, penetration, drift, and target performance. In certain implementations, the spray drift angle can be between about zero degrees and about seven degrees.

The percent open area $A_r$ of the reductant injection tube 130, or the ratio of perforation area to wall area, is an important characteristic of the tube that affects the performance of the tube. Generally, the percent open area can be determined based on a desired exhaust flow rate through the reductant injection tube 130 relative to the exhaust flow rate of exhaust gas entering the housing 100. Preferably, the flow rate of the separated exhaust gas stream 200 should be sufficient to reduce exhaust gas recirculation, provide sufficient heat transfer from the exhaust gas to the reductant spray 220, and lower precursor concentration to prevent solid reductant deposits within the reductant injection tube 130.

For the same injection velocity, a reductant spray unconfined by a reductant injection tube before being injected into exhaust gas will exhibit higher exhaust gas entrainment rates than a reductant spray that is confined by a reductant injection tube prior to entering the exhaust gas. Therefore, to increase spray penetration and reduce spray drift, one desirable characteristic of the reductant injection system 44 is to have a lower percent open area, which corresponds with a lower exhaust gas entrainment rate. A lower percent open area may also be necessary to maintain the structural integrity of the reductant injection tube 130. However, due to various constraints, the percent open area should not fall below certain lower limits. For example, the lower the percent open area of the reductant injection tube 130, the higher the flow resistance across the tube.

Because the flow resistance must be overcome in order to push exhaust gas into the reductant injection tube 130, the lower the percent open area of the injection tube, the harder it is to draw exhaust gas into the tube. Additionally, as the energy required for water evaporation and urea thermolysis is drawn from exhaust gas, the amount of exhaust gas in contact with reductant spray within the reductant injection tube 130 must be sufficiently high for proper evaporation and thermolysis to occur. Accordingly, in certain implementations, the percent open area of the reductant injection tube 130 should be kept below an upper limit for structural integrity, spray drift reduction, and spray penetration purposes, and kept above a lower limit for exhaust flow and thermal energy transfer purposes.

In one implementation, the relationship between percent open area $A_r$ of a perforated reductant injection tube 130, the exhaust entrainment coefficient $K_{entr,free}$ free for reductant spray without a perforated reductant injection tube (i.e., free spray), and the exhaust entrainment coefficient $K_{entr,conf}$ for reductant spray with a perforated injection tube (i.e., confined spray) can be expressed as follows:

$$K_{entr,conf} = K_{entr,free}\left(\frac{A_r}{100}\right) \quad (6)$$

Typically, the exhaust entrainment coefficient $K_{entr,free}$ for free spray is between about 0.7 and 0.9. Using the upper value of this range as a base point and Equation 6, the percent open area $A_r$ of the perforated injection tube 130 can be expressed as:

$$A_r = 100\left(\frac{K_{entr,conf}}{0.9}\right) \quad (7)$$

where the exhaust entrainment coefficient $K_{entr,conf}$ for confined spray is preferably between about 0.1 and about 0.3 in some implementations, and between about 0.135 and about 0.27 in specific implementations. Accordingly, in some implementations, the percent open area $A_r$ of the perforated reductant injection tube 130 is between about 11% and about 33% in some implementations, and between about 15% and about 30% in specific implementations. The desired percent open area $A_r$ of the perforated reductant injection tube 130 can be achieved using any of various perforations and perforation patterns.

However, in addition to affecting the flow rate of exhaust gas into the reductant injection tube 130 relative to the flow rate of exhaust gas entering the housing 100, the perforation configuration, e.g., the size, shape, number, and pattern of the perforations 150, also affects the distribution of separated exhaust gas stream 200 entering the tube. The distribution of exhaust gas entering the reductant injection tube 130 can affect the exhaust recirculation reduction properties of the tube 130, the heat transfer between exhaust gas and reductant spray, and the spray penetration, drift, and momentum.

Desirably, the flow rate of exhaust 200 entering the reductant spray channel 142 near the inlet 144 of the channel 142 is approximately the same as the flow rate of exhaust entering the channel near the outlet 146 of the channel. In this manner, reverse flow (e.g., recirculation) of exhaust gas within the channel 142 is reduced and the axial distance along which the transfer of heat from the exhaust gas to the reductant spray occurs is increased. However, if the pattern of perforations 150 on the reductant injection tube 130 were substantially uniform from the inlet 144 of the reductant spray channel 142 to the outlet 146 of the channel, exhaust gas flowing through the housing 100 would have a tendency to flow mainly through the lower portion of the channel (e.g., proximate the outlet 146). Accordingly, the perforations 150 should be configured to induce at least some exhaust gas to flow upward toward the upper portion of the channel 142 (e.g., proximate the inlet 144 of the channel). In preferred embodiments, inducement of exhaust gas toward the upper portion of the channel 142 is achieved by configuring the perforations 150 such that a local percent open area of the perforated tubular portion 132 is higher proximate the first end 136 (e.g., upper portion) of the perforated tubular portion and lower proximate the second end 138 (e.g., lower portion) of the perforated tubular portion. Further, in some implementations, the local percent open area uniformly decreases in an axial direction from the first end 136 to the second end 138.

Figure 6:
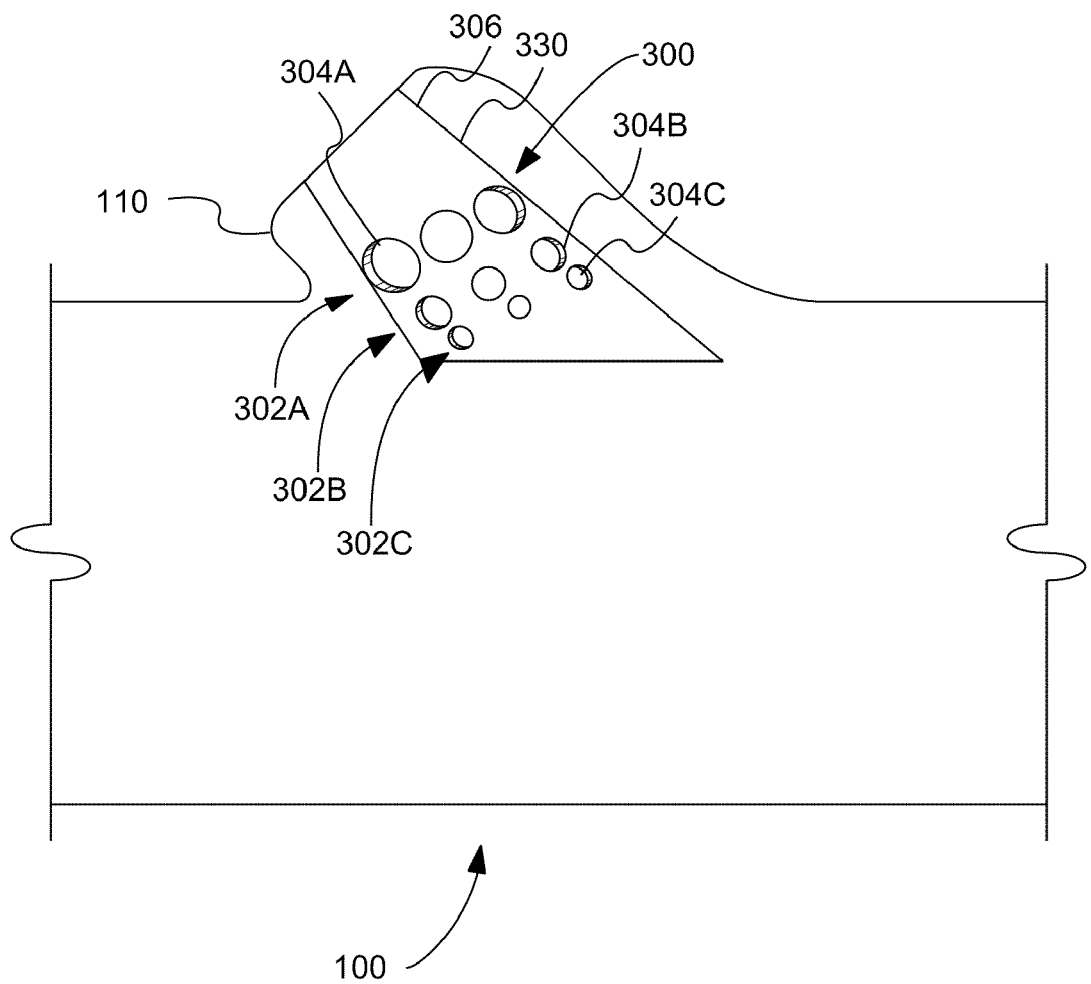
FIG. 6 is a side view of a perforated injection tube having a first perforation pattern according to one embodiment.
Figure 7:
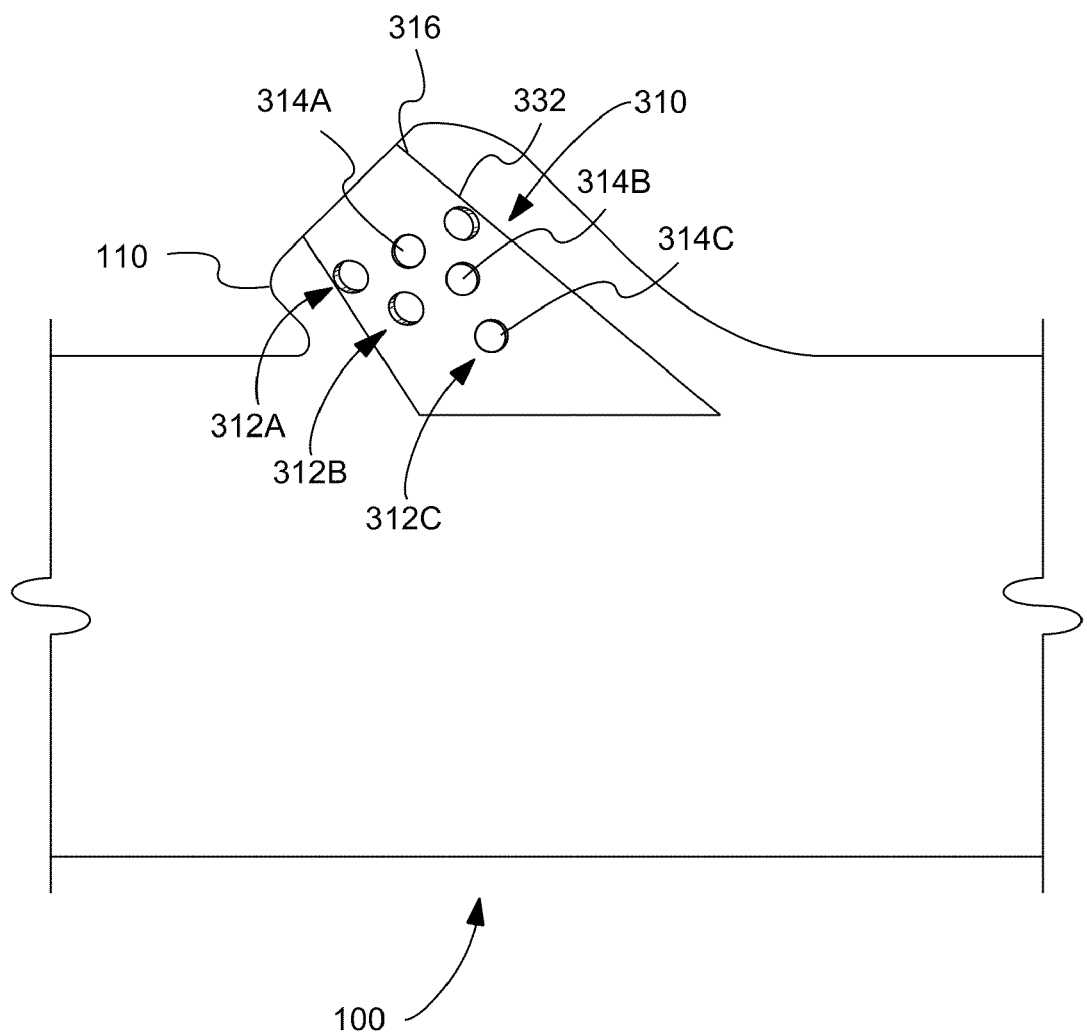
FIG. 7 is a side view of a perforated injection tube having a second perforation pattern according to one embodiment.
Figure 8:
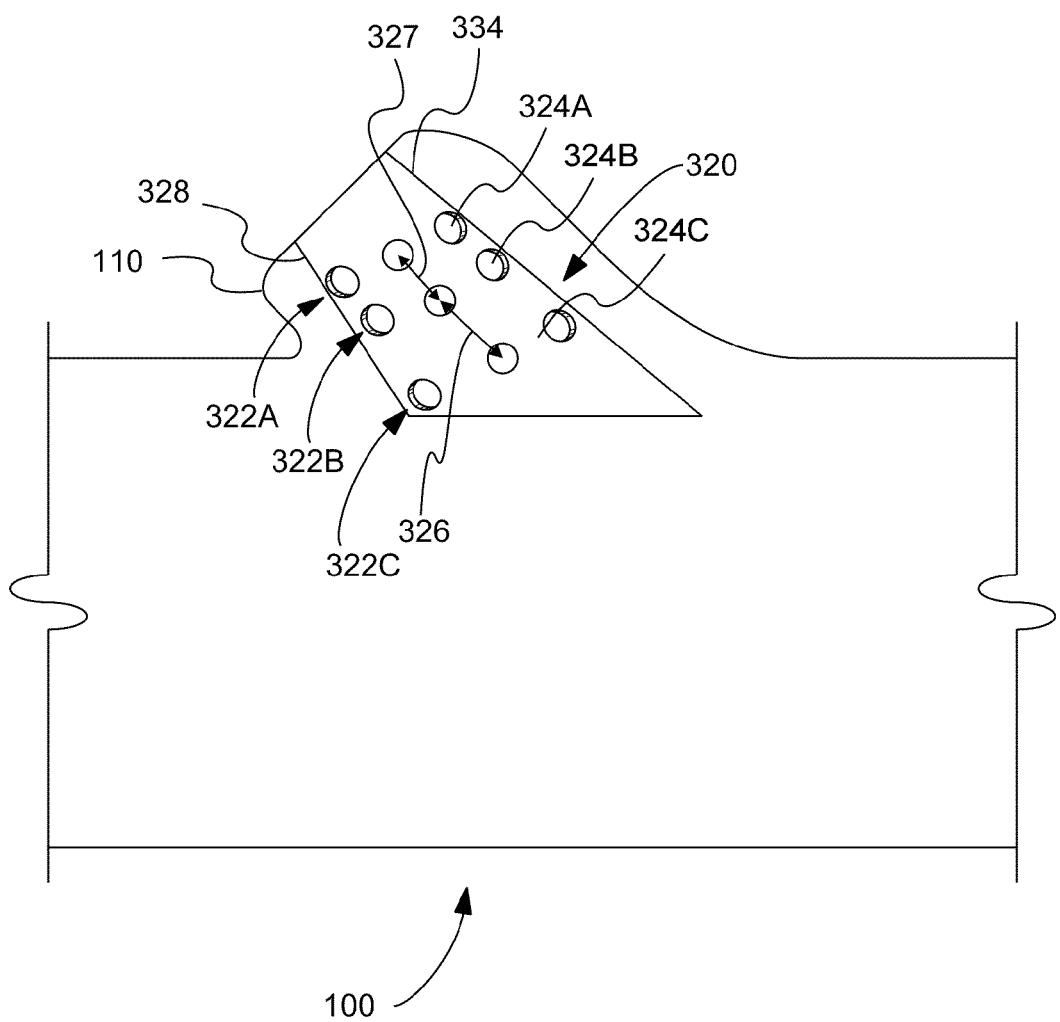
FIG. 8 is a side view of a perforated injection tube having a third perforation pattern according to one embodiment.

Referring to FIGS. 6-8, several respective perforation patterns 300, 310, 320 are shown that may achieve proper inducement of exhaust gas toward the upper portion of the perforated tubular portion 330 according to respective embodiments. Generally, the perforation pattern 300 of FIG. 6 varies the perforation size, the perforation pattern 310 of FIG. 7 varies the perforation number, and the perforation pattern 320 of FIG. 8 varies the distance between the perforations.

The perforation pattern 300 of FIG. 6 includes a plurality of perforation rows 302A-302C each having a plurality of perforations 304A-304C. As shown, the perforation row 302A is positioned closer to an upper portion 306 of a perforated tubular portion 330 than the perforation row 302C, and the perforation row 302B is positioned between the perforation rows 302A, 302C. The perforations 304A of the perforation row 302A have a larger area than the perforations 304B of the perforation row 302B, and the perforations 304B of the perforation row 302B have a larger area than the perforations 304C of the perforation row 302C. In certain implementations, the perforations 304A-304C are circular holes each having a respective diameter. The relative diameters of the perforations 304A-304C can be determined based on the size and shape of the perforated tubular portion 330. For example, in some implementations, the relative diameters of the perforations of successive rows are determined according to the following $$\frac{Ar_i}{Ar_{i+1}} = \frac{1 - n_i \frac{d_i}{D_i}}{1 - n_{n+1}\frac{d_{i+1}}{D_{i+1}}} \quad (8)$$

where $Ar_i$ denotes the percent open area in row i that has $n_i$ number of perforations each with a diameter $d_i$, $D_i$ denotes the diameter of the perforated tubular portion at the location corresponding to row i. In certain implementations, the ratio $$\frac{Ar_i}{Ar_{i+1}}$$

is maintained between about 1.05 and about 1.15. In some specific implementations, a minimum diameter of the perforations is between about 0.125 inches and about 0.250 inches.

The perforation pattern 310 of FIG. 7 includes a plurality of perforation rows 312A-312C each having at least one perforation 314A-314C. As shown, the perforation row 312A is positioned closer to an upper portion 316 of a perforated tubular portion 332 than the perforation row 312C, and the perforation row 312B is positioned between the perforation rows 312A, 312C. Each of the perforations 314A-314C has approximately the same size. However, the perforation row 312A has more perforations than the perforation row 312B, and the perforation row 312B has more perforations than the perforation row 312C. The relative number of perforations of the perforation rows 312A-312C can be determined according to Equation 8 described above.

The perforation pattern 320 includes a plurality of perforation rows 322A-322C each having a plurality of perforations 324A-324C. As shown, the perforation row 322A is positioned closer to an upper portion 328 of a perforated tubular portion 334 than the perforation row 322C, and the perforation row 322B is positioned between the perforation rows 322A, 322C. Each of the perforation rows 322A-322C has the same number of perforations 324A-324C with the perforations having approximately the same size. However, the perforation row 322C is spaced a different axial distance 326 apart from perforation row 322B than the axial distance 327 between perforation row 322A and perforation row 322B. In certain implementations, the relative distances 326, 327 between centers of the holes in perforation rows 322A-322C can be between d and 2d, where d is the diameter of the perforations.

Although the perforation patterns 300, 310, 320 each include three rows of perforations, in other embodiments, the perforation patterns can include less or more than three rows. Additionally, although the perforations 304A-304C, 314A-314C, 324A-324C are shown as having a circular shape, in other embodiments, the perforations can have any of various shapes as desired without departing from the spirit of the invention. Further, any two or more of the above perforation patterns 300, 310, 320 can be combined as desired. For example, in one implementation, a perforated tubular portion can include one row of perforations having a first perforation size and first number of perforations and another row of perforations having a second perforation size and second number of perforations different than the first perforation size and first number of perforations.

According to one additional embodiment, the reductant injection tube 130 is configured to avoid or reduce impingement of reductant spray on the inner surface of the perforated tubular portion 132 along the reductant spray channel 142. More specifically, in certain implementations, the perforated tubular portion 132 defines an included angle β expressed as follows:

$$\beta = \alpha + \delta \quad (9)$$

where α is the included angle of the reductant spray 220 and δ is an angle between about 5-degrees and about 15-degrees (see FIG. 5). In more specific implementations, the angle δ is greater than 15-degrees.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A reductant injection apparatus, comprising:
   an injector attachment portion to which a reductant injector is coupleable; and
   a perforated tubular portion extending from the injector attachment portion, the perforated tubular portion comprising an inlet, an outlet, and a diverging sidewall extending from the inlet to the outlet, wherein a plurality of perforations is formed in the diverging sidewall, the diverging sidewall also having a truncated conical shape with an upstream leading edge that is shorter than a downstream trailing edge.

2. The apparatus of claim 1, wherein the sidewall defines a reductant spray channel through which a reductant spray is flowable in a first direction extending from the inlet to the outlet.

3. The apparatus of claim 1, wherein the injector attachment portion secures a reductant injector in a predetermined orientation relative to the perforated tubular portion.

4. The apparatus of claim 1, wherein the plurality of perforations is arranged in a plurality of rows, the plurality of rows comprising a first row of perforations each having a first size and a second row of perforations each having a second size smaller than the first size, wherein the first row of perforations is closer to the inlet than the second row of perforations.

5. The apparatus of claim 1, wherein the plurality of perforations is arranged in a plurality of rows, the plurality of rows comprising a first row of a first number of perforations and a second row of a second number of perforations, the second number being smaller than the first number, wherein the first row is closer to the inlet than the second row.

6. The apparatus of claim 1, wherein the plurality of perforations is arranged in a plurality of rows comprising at least first, second, and third rows of perforations, wherein the first row of perforations is separated from the second row of perforations by a first distance, and the second row of perforations is separated from the third row of perforations by a second distance more than the first distance, wherein the first row of perforations is closer to the inlet than the second row of perforations.

7. The apparatus of claim 1, wherein a percent open area of the perforated tubular portion is between about 11% and about 33%.

8. The apparatus of claim 1, wherein a local percent open area proximate the inlet of the perforated tubular portion is larger than a local percent open area proximate the outlet of the perforated tubular portion.

9. The apparatus of claim 1, wherein the perforated tubular portion comprises a cross-sectional shape corresponding to a cross-sectional shape of a reductant spray pattern associated with the reductant injector.

10. The apparatus of claim 1, wherein the diverging sidewall forms a first included angle and a reductant spray pattern associated with the reductant injector forms a second included angle, and wherein the first included angle is between about 5-degrees and about 15-degrees larger than the second included angle.

11. A reductant injection and decomposition system for a selective catalytic reduction system, comprising:
   a housing through which an exhaust gas stream is flowable, the housing including a reductant injector receptacle; and
   a perforated tubular element coupled to the reductant injector receptacle in exhaust gas receiving communication with the exhaust gas stream and in reductant spray receiving communication with a reductant injector coupled to the perforated tubular element, the perforated tubular element comprising an inlet, an outlet, and a diverging sidewall extending from the inlet to the outlet, wherein a plurality of perforations are formed in the diverging sidewall, the diverging sidewall also having a truncated conical shape with an upstream leading edge that is shorter than a downstream trailing edge,
   wherein reductant spray from the reductant injector flows within the perforated tubular element from the inlet to the outlet and a portion of the exhaust gas stream enters the perforated tubular element via a plurality of perforations proximate the upstream leading edge and exits the perforated tubular element via a plurality of perforations proximate the downstream trailing edge.

12. The system of claim 11, wherein the perforated tubular element secures the reductant injector in a predetermined orientation such that the reductant injector sprays reductant in a direction parallel to a central axis of the perforated tubular element, and wherein the reductant receptacle secures the perforated tubular element such that the central axis of the perforated tubular element is at a predetermined injected spray angle relative to an exhaust gas stream flow direction.

13. The system of claim 12, wherein a spray drift angle is the difference between the predetermined injected spray angle and an angle defined between a velocity vector of a combined reductant spray and exhaust gas mixture and the exhaust gas stream flow direction, and wherein the spray drift angle is between about zero degrees and about seven degrees.

14. The system of claim 11, wherein the housing defines a substantially cylindrically-shaped decomposition chamber and the reductant injector receptacle defines a space positioned about a periphery of the decomposition chamber, wherein the inlet of the perforated tubular element is positioned within the space of the reductant injector receptacle, and wherein the outlet of the perforated tubular element is positioned within the decomposition chamber.

15. The system of claim 14, wherein the perforated tubular element is positioned within the space such that a gap is defined between the downstream trailing edge of the perforated tubular element and a wall of the reductant injector receptacle, and wherein the portion of the exhaust gas stream flows through the gap upon exiting from the plurality of perforations proximate the downstream trailing edge.

16. A method for injecting reductant into an exhaust gas stream, comprising:
positioning a perforated tubular element in the exhaust gas stream and in reductant receiving communication with a reductant injector, the perforated tubular element comprising an inlet, an outlet, and a diverging sidewall extending from the inlet to the outlet, wherein a plurality of perforations are formed in the diverging sidewall, the diverging sidewall also having a truncated conical shape with an upstream leading edge that is shorter than a downstream trailing edge;
injecting a reductant spray into the perforated tubular element via the inlet;
pushing a portion of the exhaust gas stream into the tubular element through a plurality of perforations proximate the upstream leading edge; and
pulling the portion of the exhaust gas stream within the tubular element out of the tubular element through a plurality of perforations proximate the downstream trailing edge.

17. The method of claim 16, further comprising transferring at least one of mass, momentum, and energy from the portion of exhaust gas stream within the perforated tubular element to the reductant spray within the perforated tubular element.

18. The method of claim 16, further comprising positioning the upstream leading edge of the perforated tubular element in the exhaust gas stream to divert a portion of the exhaust gas stream about the outlet of the perforated tubular element.

19. The method of claim 16, wherein pushing the portion of the exhaust gas into the tubular element comprises stagnating exhaust gas against the upstream leading edge of the perforated tubular element.

20. The method of claim 16, wherein pulling the portion of the exhaust gas within the tubular element out of the tubular element comprises accelerating exhaust gas proximate a downstream portion of the perforated tubular element via a venturi effect.

21. A method for injecting reductant into an exhaust gas stream, comprising:
positioning a perforated tubular element in a bulk exhaust gas stream and in reductant receiving communication with a reductant injector, the perforated tubular element comprising an inlet, an outlet, and a diverging sidewall extending from the inlet to the outlet, wherein a plurality of perforations are formed in the diverging sidewall, the diverging sidewall also having a truncated conical shape with an upstream leading edge that is shorter than a downstream trailing edge;
injecting a reductant spray into the perforated tubular element via the inlet;
diverting a portion of the bulk exhaust gas stream into the perforated tubular element through a plurality of perforations proximate the upstream leading edge, through the perforated tubular element, and out of the perforated tubular element through a plurality of perforations proximate the downstream trailing edge; and
rejoining the portion of the exhaust gas stream with the bulk exhaust gas stream downstream of the perforated tubular element.

* * * * *